US012669665B2

(12) United States Patent
Sato et al.

(10) Patent No.: US 12,669,665 B2
(45) Date of Patent: Jun. 30, 2026

(54) OPTICAL FIBER UNIT, OPTICAL FIBER CABLE, CONNECTOR-EQUIPPED CABLE, AND METHOD FOR CONNECTING OPTICAL FIBER UNIT

(71) Applicant: SUMITOMO ELECTRIC INDUSTRIES, LTD., Osaka (JP)

(72) Inventors: Fumiaki Sato, Osaka (JP); Masakazu Takami, Osaka (JP); Yuuki Shimoda, Osaka (JP); Takako Muramoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 150 days.

(21) Appl. No.: 17/904,818

(22) PCT Filed: May 24, 2021

(86) PCT No.: PCT/JP2021/019582
§ 371 (c)(1),
(2) Date: Aug. 23, 2022

(87) PCT Pub. No.: WO2021/241485
PCT Pub. Date: Dec. 2, 2021

(65) Prior Publication Data
US 2023/0110693 A1 Apr. 13, 2023

(30) Foreign Application Priority Data
May 25, 2020 (JP) ................................. 2020-090649

(51) Int. Cl.
*G02B 6/44* (2006.01)

(52) U.S. Cl.
CPC ........... *G02B 6/441* (2013.01); *G02B 6/4403* (2013.01); *G02B 6/443* (2013.01); *G02B 6/4431* (2023.05); *G02B 6/4454* (2013.01)

(58) Field of Classification Search
CPC ...... G02B 6/4403; G02B 6/441; G02B 6/443; G02B 6/4431; G02B 6/4454; G02B 6/4407
See application file for complete search history.

(56) References Cited

U.S. PATENT DOCUMENTS

| 4,997,256 A | * | 3/1991 | Sano | ..................... G02B 6/4438 385/102 |
| 10,593,441 B1 | * | 3/2020 | McNutt | .................. H01B 11/22 |

(Continued)

FOREIGN PATENT DOCUMENTS

| CN | 210323499 U | 4/2020 |
| JP | 2005-156712 A | 6/2005 |

(Continued)

OTHER PUBLICATIONS

Machine Translation from Google Patents of CN-110515168-A, Li et al., published Nov. 29, 2019 (Year: 2019).*

(Continued)

*Primary Examiner* — Thomas A Hollweg
*Assistant Examiner* — Kirsten D. Endresen
(74) *Attorney, Agent, or Firm* — McDonald Hopkins LLC

(57) ABSTRACT

An optical fiber unit includes a plurality of optical fibers, a fibrous filler disposed along the plurality of optical fibers, and a resin film covering the plurality of optical fibers and the fibrous filler from outside. In the optical fiber unit, the resin film has a film thickness smaller than a diameter of the fibrous filler.

11 Claims, 7 Drawing Sheets

(56)                References Cited

U.S. PATENT DOCUMENTS

| | | | |
|---|---|---|---|
| 2005/0244115 | A1 | 11/2005 | Bocanegra et al. |
| 2006/0127016 | A1* | 6/2006 | Baird .................. G02B 6/4431 |
| | | | 385/113 |
| 2011/0110635 | A1 | 5/2011 | Toge et al. |
| 2015/0268430 | A1 | 9/2015 | Bringuier et al. |
| 2016/0041354 | A1* | 2/2016 | Guenter ............... G02B 6/4431 |
| | | | 385/86 |
| 2017/0153404 | A1 | 6/2017 | Takeda et al. |
| 2018/0348464 | A1* | 12/2018 | Sato ......................... G02B 6/44 |
| 2020/0209505 | A1* | 7/2020 | Ohno ................. G02B 6/44384 |
| 2021/0141178 | A1 | 5/2021 | Kaji et al. |

FOREIGN PATENT DOCUMENTS

| | | | |
|---|---|---|---|
| JP | 2005-316493 | A | 11/2005 |
| JP | 2010-008923 | A | 1/2010 |
| JP | 2014-016529 | A | 1/2014 |
| JP | 5719052 | B1 | 5/2015 |
| JP | 2015-517679 | A | 6/2015 |
| JP | 2017-134267 | A | 8/2017 |
| JP | 2019-109400 | A | 7/2019 |
| JP | 2019-113618 | A | 7/2019 |
| JP | 2019-184667 | A | 10/2019 |
| WO | 2013/165407 | A1 | 11/2013 |
| WO | 2016/048804 | A1 | 3/2016 |

OTHER PUBLICATIONS

International Search Report dated Jul. 27, 2021 issued in Patent Application No. PCT/JP2021/019582.
Written Opinion dated Jul. 27, 2021 issued in Patent Application No. PCT/JP2021/019582.

* cited by examiner

2

10

20

OPTICAL FIBER UNIT, OPTICAL FIBER CABLE, CONNECTOR-EQUIPPED CABLE, AND METHOD FOR CONNECTING OPTICAL FIBER UNIT

TECHNICAL FIELD

The present disclosure relates to an optical fiber unit, an optical fiber cable, a connector-equipped cable, and a method for connecting an optical fiber unit.

The present application claims priority from Japanese Patent Application No. 2020-090649 filed on May 25, 2020, contents of which are incorporated by reference in its entirety.

BACKGROUND ART

In the related art, an example of an optical fiber cable includes a loose tube type cable, in which optical fiber units each including a plurality of optical fibers that are put together are each coated with a resin tube and bundled and covered with a cable sheath. Another example includes a slotless cable in which resin tubes are omitted and optical fibers are installed in a cable sheath at a large density (for example, Patent Literatures 1, 2, and 3).

CITATION LIST

Patent Literature

Patent Literature 1: JP-T-2015-517679
Patent Literature 2: JP-A-2014-016529
Patent Literature 3: JP-A-2010-008923

SUMMARY OF INVENTION

In order to solve the above problem, an optical fiber unit according to the present disclosure includes:

a plurality of optical fibers;
a fibrous filler disposed along the plurality of optical fibers; and
a resin film covering the plurality of optical fibers and the fibrous filler from outside,
in which the resin film has a film thickness smaller than a diameter of the fibrous filler.

Further, an optical fiber cable according to the present disclosure includes:

a plurality of the optical fiber units; and
a sheath coating the plurality of optical fiber units.

Further, a connector-equipped cable according to the present disclosure includes:

the optical fiber unit; and
at least one multi-core connector provided at one end of the optical fiber cable.

Further, a method for connecting an optical fiber unit according to the present disclosure includes:

from an optical fiber cable including a plurality of optical fiber units each formed by coating a plurality of optical fibers and a fibrous filler disposed along the plurality of optical fibers with a resin film having a film thickness smaller than a diameter of the fibrous filler, distinguishing at least one of the optical fiber units; and
connecting the distinguished optical fiber unit to a splice tray and to another optical fiber unit.

DESCRIPTION OF EMBODIMENTS

Technical Problem

Figure 1:
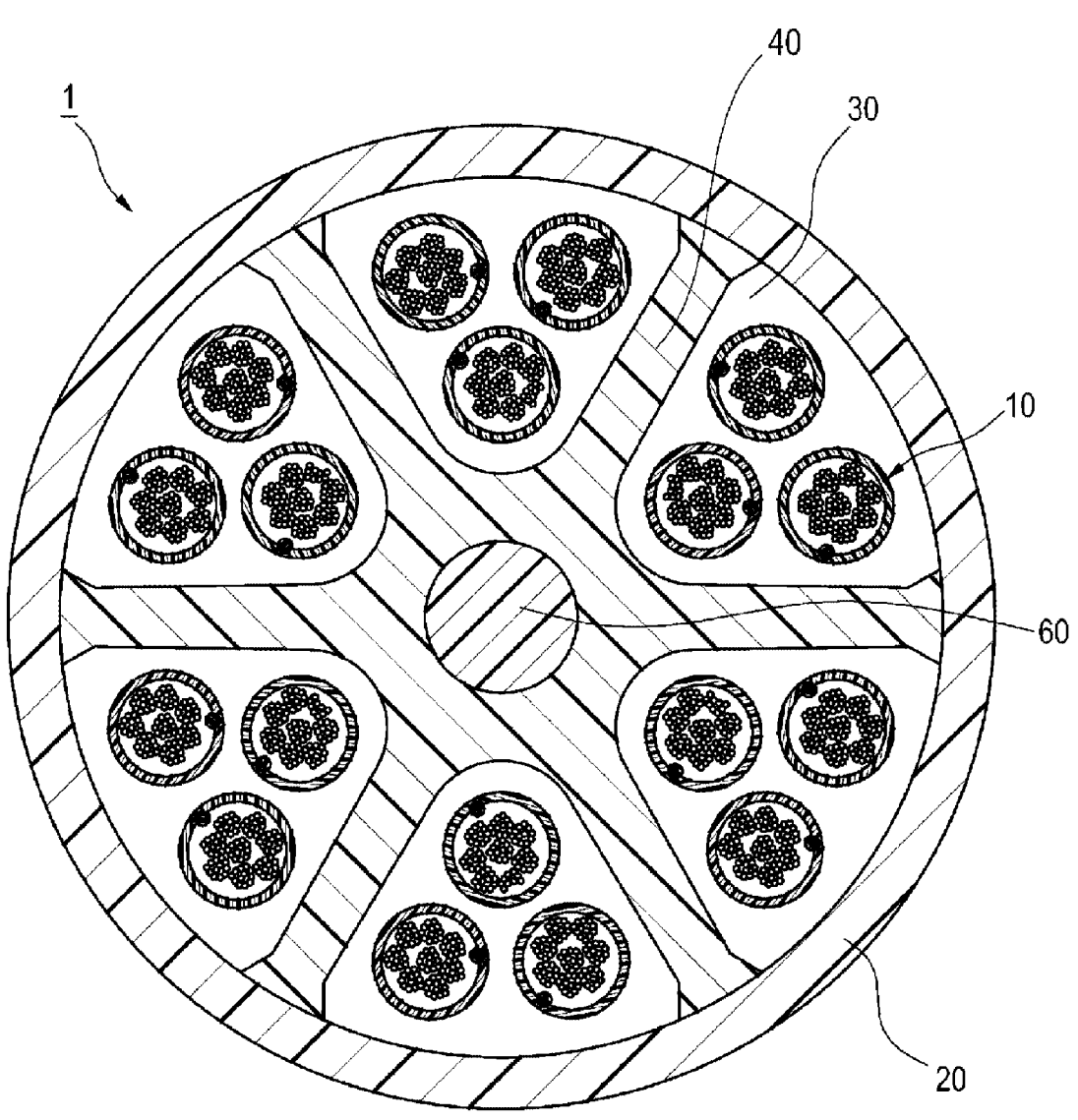
FIG. 1 is a cross-sectional view of a slot-type optical fiber cable according to an embodiment of the present disclosure.

In the loose tube type cable, since the optical fiber units are each covered with the resin tube, the optical fiber units are easily distinguished when taken out of the cable. However, generally, a thickness of the resin tube is thick, and thus it may be difficult to install the optical fibers at a large density, and it is desired to improve workability when opening the resin tube and taking out the optical fibers.

On the other hand, the slotless type cable does not include a hard tube, and thus is better in terms of the installing density of the optical fibers. However, when the optical fiber units are taken out of the cable, the individual optical fibers are likely to be separated, and it is desired to improve identifiability of the optical fiber units.

The present disclosure provides an optical fiber unit, an optical fiber cable, a connector-equipped cable, and a method for connecting an optical fiber unit, in which optical fibers may be installed at a large density, and in which identifiability of the optical fiber unit and workability at the time of taking out the optical fibers are improved.

DESCRIPTION OF EMBODIMENTS OF PRESENT DISCLOSURE

First, embodiments of the present disclosure will be listed and described.

(1) An aspect of the present disclosure provides an optical fiber unit including:

a plurality of optical fibers;
a fibrous filler disposed along the plurality of optical fibers; and
a resin film covering the plurality of optical fibers and the fibrous filler from outside,
in which the resin film has a film thickness smaller than a diameter of the fibrous filler.

According to the optical fiber unit of the present disclosure, the fibrous filler functions as a tearing string for tearing the resin film of the optical fiber unit, so that the individual optical fibers may be easily taken out of the resin film. In this case, since the resin film has a thin film shape in which the film thickness is smaller than the diameter of the fibrous filler, the fibrous filler is easily torn and the optical fibers are easily taken out. Further, the resin film may be thinned, and thus the optical fibers may be installed in a cable at a large density. Further, since the optical fiber unit is coated with the resin film, it is easy to distinguish the optical fiber unit in the cable.

(2) The fibrous filler may be provided on an inner surface of the resin film along a longitudinal direction of the optical fibers.

According to the present disclosure, since the fibrous filler is provided on the inner surface of the resin film along the longitudinal direction of the optical fibers and is located outside the plurality of optical fibers, the optical fibers are not damaged when the resin film is torn by the fibrous filler.

(3) At least a part of the fibrous filler may be embedded in the resin film.

According to the present disclosure, since at least a part of the fibrous filler is embedded in the resin film, the position of the fibrous filler is stabilized, and the fibrous filler is pot embedded in the optical fibers.

(4) The plurality of optical fibers may be formed by stranding a plurality of single-core optical fibers or a plurality of bundles of a plurality of optical fibers.

According to the present disclosure, since the plurality of optical fibers are stranded together, the optical fiber unit is less likely to be separated from each other when taken out of the cable.

(5) The plurality of optical fibers may be an intermittent-connection-type optical fiber ribbon including, intermittently in the longitudinal direction of the plurality of optical fibers, a connection portion at which adjacent optical fibers are connected and a non-connection portion at which adjacent optical fibers are not connected in a state in which the plurality of optical fibers is arranged in parallel in a direction orthogonal to the longitudinal direction. The connection portion and the non-connection portion may be disposed in a part or all of the plurality of optical fibers.

An example of the plurality of optical fibers may include an intermittent-connection-type optical fiber ribbon. With the intermittent-connection-type optical fiber ribbon, the optical fibers may be installed in the optical fiber cable at a larger density.

(6) The plurality of optical fibers may be formed by stranding a plurality of the intermittent-connection-type optical fiber ribbons.

According to the present disclosure, since the plurality of intermittent-connection-type optical fiber ribbons are stranded together, the intermittent-connection-type optical fiber ribbons are less likely to be separated from each other when the optical fiber unit is taken out of the cable.

(7) The resin film may include an inorganic filler.

According to the present disclosure, since the resin film includes the inorganic filler, the resin film is easily torn.

(8) The fibrous fillers may include a water absorbent fiber.

According to the present disclosure, since the fibrous filler includes the water-absorbent fiber, the waterproof property of the optical fiber unit may be improved.

(9) The fibrous filles may be a PET monofilament.

According to the present disclosure, since the fibrous filler is a PET monofilament, the resin film is more easily torn.

(10) Another aspect of the present disclosure provides an optical fiber cable including: a plurality of the optical fiber units; and a sheath coating the plurality of optical fiber units.

According to the optical fiber cable of the present disclosure, since the resin film is thin, optical fiber units may be easily deformed and the optical fibers may be installed at a large density.

(11) The optical fiber cable may include a slot rod having a groove that accommodates at least one of the plurality of optical fiber units inside the sheath.

According to the present disclosure, the optical fibers may be installed in the slot groove at a large density.

(12) Another aspect of the present disclosure provides a connector-equipped cable including:

the optical fiber unit; and at least one multi-core connector provided at one end of the optical fiber unit.

Such a configuration facilitates cable connection.

(13) Another aspect of the present disclosure provides a method for connecting an optical fiber unit. The method includes:

from an optical fiber cable including a plurality of the optical fiber units formed by coating a plurality of optical fibers and a fibrous filler disposed along the plurality of optical fibers with a resin film having a film thickness smaller than a diameter of the fibrous filler, distinguishing at least one of the optical fiber unit; and connecting the distinguished optical fiber unit to a splice tray and to another optical fiber unit.

Since the resin film is coated on the plurality of optical fibers and the fibrous filler, the optical fiber unit may be easily installed on the splice tray. Further, the resin film May prevent external damage of the plurality of optical fibers and the fibrous filler when the optical fiber unit is installed on the splice tray.

Advantageous Effects of Invention

According to the present disclosure, it is possible to provide an optical fiber unit, an optical fiber cable, a connector-equipped cable, and a method for connecting an optical fiber unit, in which optical fibers may be installed at a large density, and in which identifiability of the optical fiber unit and workability at the time of taking out the optical fibers are improved.

DETAILS OF FIRST EMBODIMENT OF
PRESENT DISCLOSURE

Specific examples of an optical fiber unit and an optical fiber cable according to an embodiment of the present disclosure will be described with reference to the drawings. The present disclosure is not limited to these examples but defined by the scope of the claims, and is intended to include all modifications within the scope and meaning equivalent to the scope of the claims.

FIG. 1 is a cross-sectional view of a slot-type optical fiber cable 1 according to the embodiment of the present disclosure, which is an example of a loose tube type optical fiber cable. In the slot-type optical fiber cable 1 as illustrated in FIG. 1, a plurality of optical fiber units 10 are reinforced by a strength member 60, accommodated in grooves 30 of a slot rod 40, and covered by a sheath 20.

Hereinafter, the optical fiber unit 10 will be described.

Figure 2:
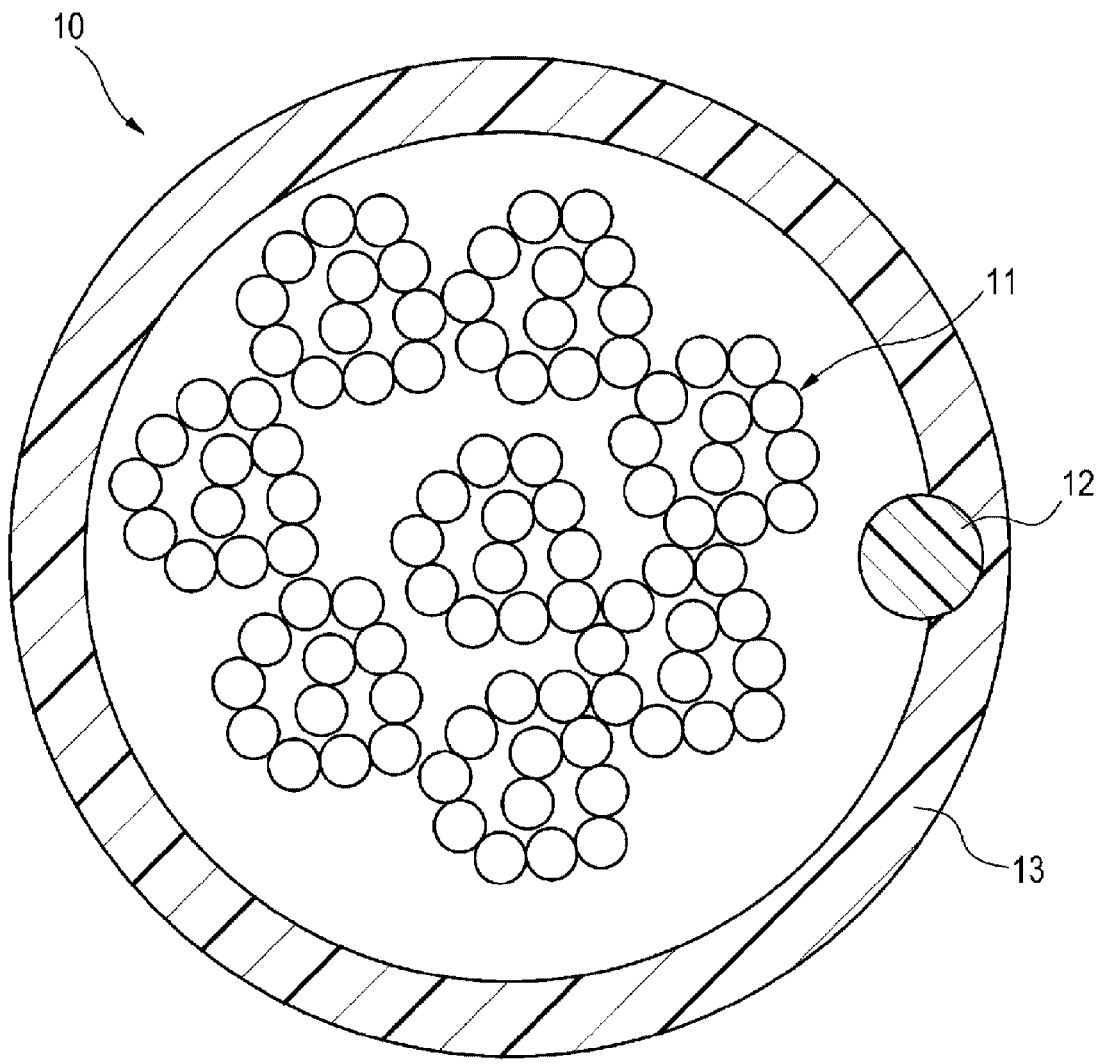
FIG. 2 is a cross-sectional view of an optical fiber unit constituting the slot-type optical fiber cable.
Figure 3:
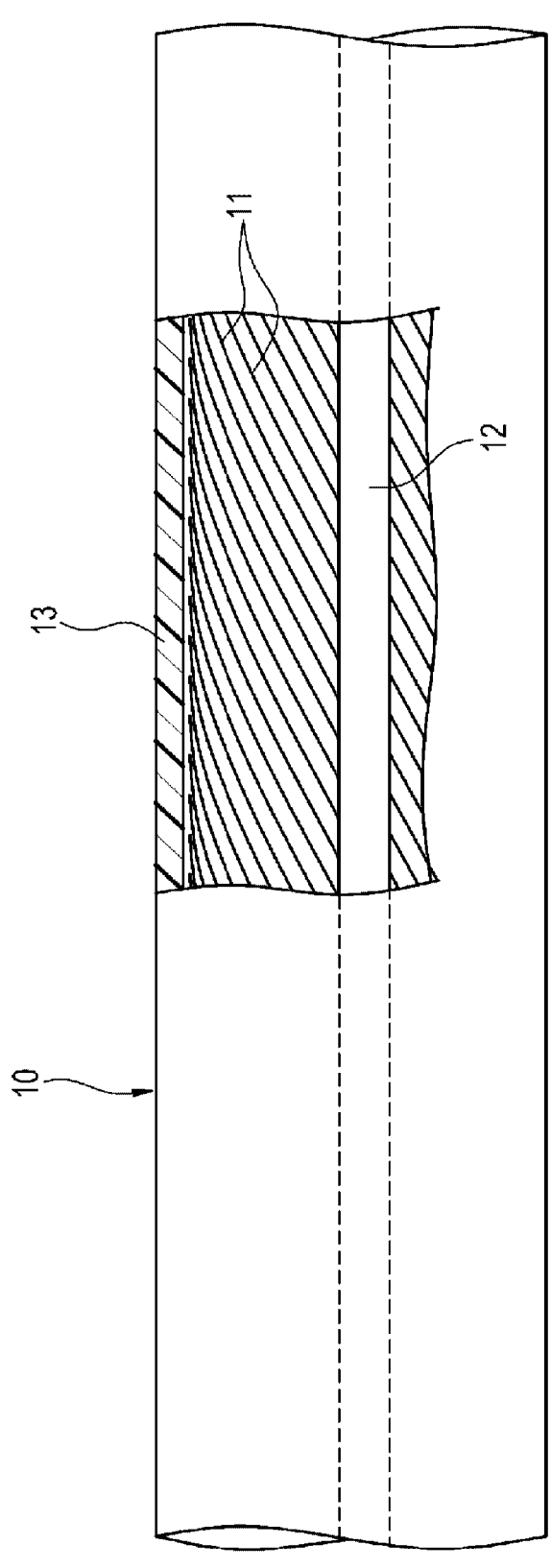
FIG. 3 is a side sectional view schematically illustrating a part of the optical fiber unit in FIG. 2 in a longitudinal direction.

FIG. 2 is a cross-sectional view of the optical fiber unit 10. FIG. 3 is a side sectional view schematically illustrating a part of the optical fiber unit 10 in a longitudinal direction. As illustrated in FIGS. 2 and 3, the optical fiber unit 10 includes a plurality of optical fibers 11, a tearing string (fibrous filler) 12 disposed along the plurality of optical fibers 11, and a resin film 13 with which the plurality of optical fibers 11 and the tearing string 12 are coated from the outside.

The tearing string 12 is provided on an inner surface of the resin film 13 along the longitudinal direction of the optical fibers 11. The tearing string 12 is formed of a material having a larger strength than the resin film 13, and the optical fibers 11 are taken out of the optical fiber unit 10 by pulling the tearing string 12 and tearing the resin film 13. As illustrated in FIG. 2, at least a part of the tearing string 12 is embedded in the resin film 13.

The tearing string 12 includes water-absorbent fibers, thereby improving the waterproof property in the resin film 13. The tearing string 12 includes, for example, water absorption yarn, and is formed of a PET monofilament. The tearing string 12 has an outer diameter of, for example, 0.3 mm.

As illustrated in FIG. 3, the resin film 13 is coated on the optical fibers 11 and the tearing string 12 over the entire length of the optical fiber unit 10 in the longitudinal direction. The resin film 13 is formed of a thermoplastic material such as elastomer or LDPE.

The resin film 13 has a film thickness smaller than the diameter of the tearing string 12. The film thickness of the resin film 13 is less than 0.3 mm, particularly preferably 0.2 mm or less.

The resin film 13 is formed of a member having a small strength and a small elongation rate to be torn by the tearing string 12. Specifically, the resin film 13 preferably includes an inorganic filler such as magnesium hydroxide, aluminum hydroxide, calcium carbonate, or silica. In particular, aluminum hydroxide and calcium carbonate are more preferable since they have flame retardancy and low smoke emission. For example, the resin film 13 has a tensile breaking strength of 20 MPa or less and a breaking elongation of 200% or less.

As illustrated in FIG. 3, the plurality of optical fibers 11 are put together by stranding a plurality of bundles of a plurality of optical fibers together.

Figure 4:
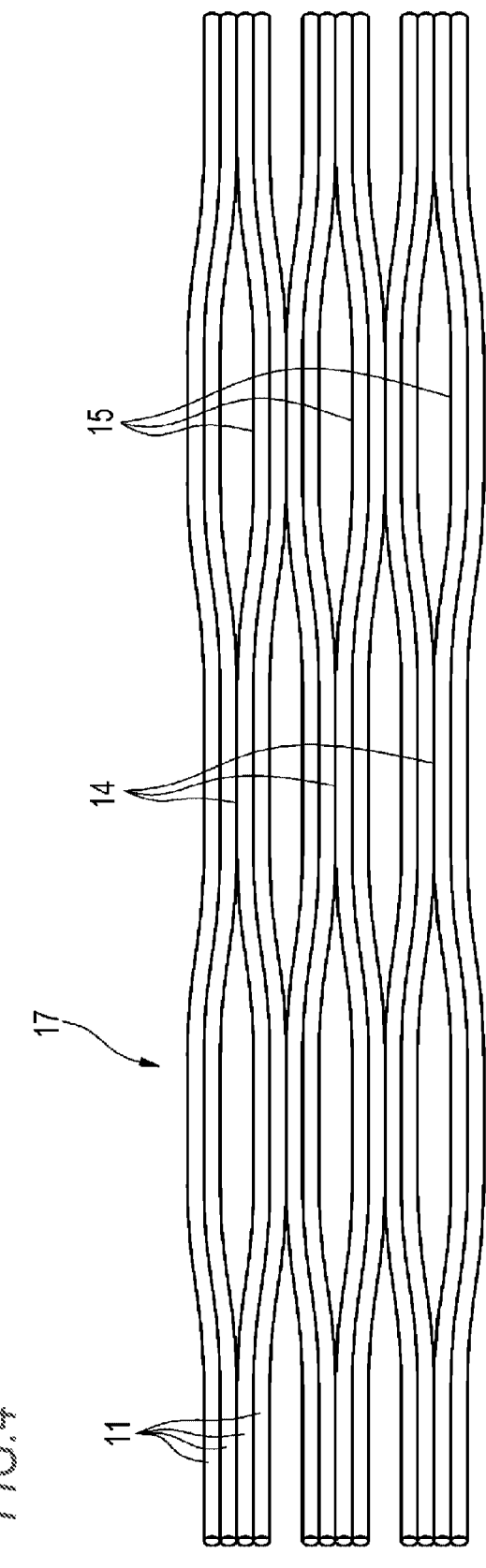
FIG. 4 is an exploded view illustrating a part of an intermittent-connection-type optical fiber ribbon used in the optical fiber unit in FIG. 3 in the longitudinal direction.

Specifically, the plurality of optical fibers 11 constitute an intermittent-connection-type optical fiber ribbon 17 as illustrated in FIG. 4, and are put together by further stranding a plurality of intermittent-connection-type optical fiber ribbons 17.

FIG. 4 is an exploded view illustrating a part of the intermittent-connection-type optical fiber ribbon 17 in the longitudinal direction. In the intermittent-connection-type optical fiber ribbon 17 as illustrated in FIG. 4, the plurality of optical fibers 11 are arranged in parallel in a direction orthogonal to the longitudinal direction of the optical fibers 11, and a part of adjacent optical fibers 11 are connected to form connection portions 14. The connection portions 14 are intermittent along the optical fibers 11. That is, the connection portions 14 and non-connection portions 15 are alternated along the optical fibers 11.

Figure 5:
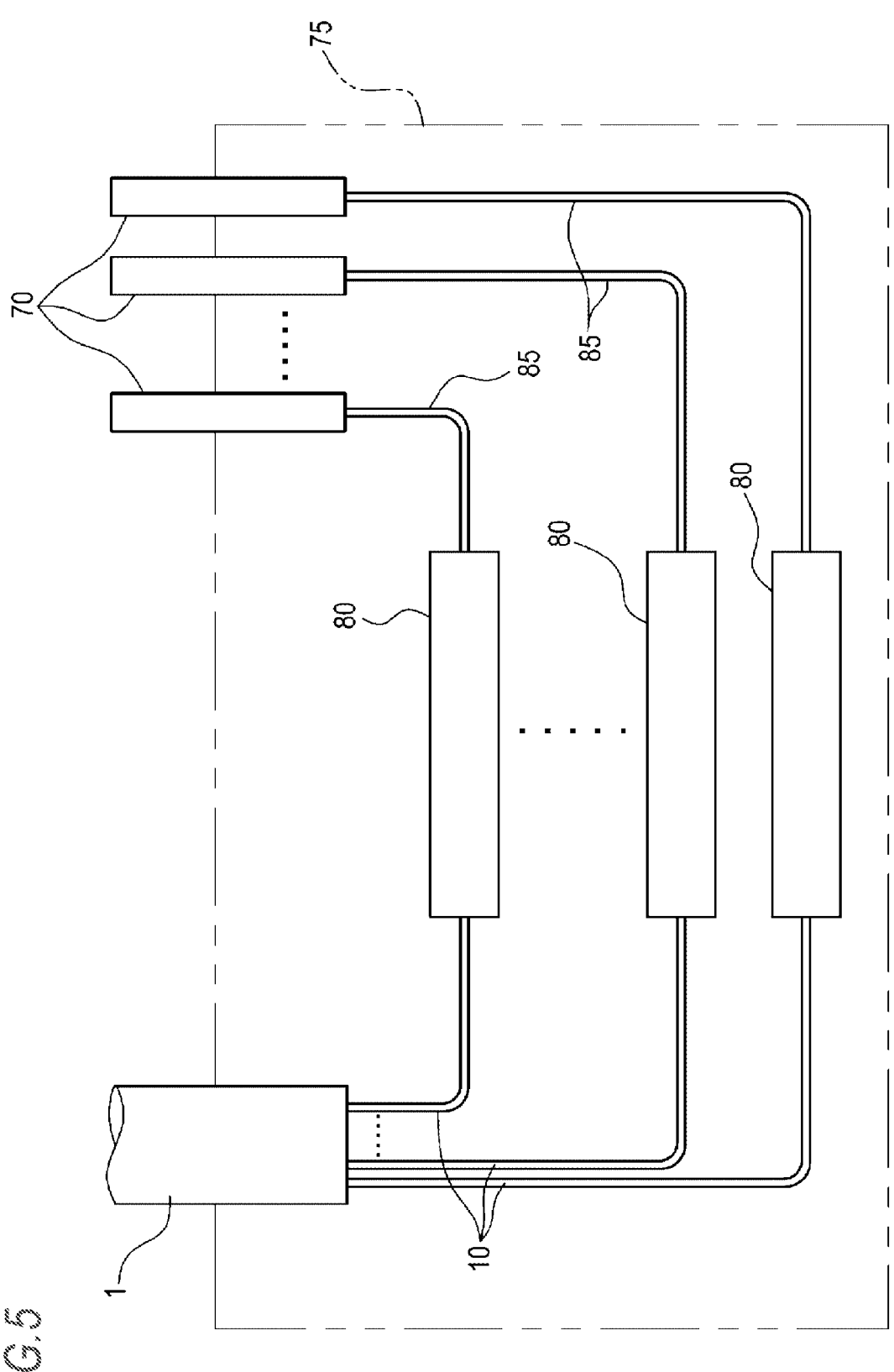
FIG. 5 is a connection diagram schematically showing a state when the optical fiber cable in FIG. 1 is connected to other optical fiber units.

FIG. 5 is a connection diagram schematically showing a state when the slot-type optical fiber cable 1 is connected to another optical fiber cable 70. As illustrated in FIG. 5, the optical fiber units 10 are led out of the slot-type optical fiber cable 1 that is introduced into an optical connection box 75, and are respectively connected to splice trays 80. In the splice tray 80, the optical fibers 11 are connected to other optical fiber units 85 that are led out of the other optical fiber cable 70. At this time, the plurality of coated optical fibers 11 may be taken out of the slot-type optical fiber cable 1 while distinguishing each optical fiber unit 10 coated with the resin film 13, and thus the plurality of coated optical fibers 11 are not separated and may be easily distinguished.

When the optical fibers 11 are taken out of the optical fiber unit 10, the tearing string 12 is pulled by an operator and the resin film 13 is torn. Since the resin film 13 is formed in a thin film shape, the optical fibers 11 may be easily taken out of the optical fiber unit 10 by the operator.

As described above, in the optical fiber unit 10 according to the present embodiment, since the tearing string 12 for tearing the resin film 13 is provided along the plurality of optical fibers 11, the resin film 13 may be torn and the individual optical fibers 11 may be easily taken out. In this case, since the resin film 13 has a thin film shape in which the film thickness is smaller than the diameter of the tearing string 12, the resin film 13 is easily torn and the optical fibers 11 are easily taken out.

Further, since the tearing string 12 is provided on the inner surface of the resin film 13 along the longitudinal direction of the optical fibers 11 and is located outside the plurality of optical fibers 11, the optical fibers 11 are not damaged when the resin film 13 is torn by the tearing string 12. Since at least a part of the tearing string 12 is embedded in the resin film 13, the position of the tearing string 12 in the resin film 13 is stabilized, and the tearing string 12 is not embedded in the optical fibers 11.

In the present embodiment, since the entire tearing string 12 is not embedded in the resin film 13, the thickness of the resin film 13 may be reduced. Therefore, the optical fibers 11 may be installed in the optical fiber cable 1 at a large density. Further, since the resin film 13 is thin, the optical fiber unit 10 may be easily deformed, and the optical fibers 11 may be installed at a large density.

Further, since the resin film 13 covers the optical fiber unit 10, the optical fiber unit 10 in the optical fiber cable 1 is easily distinguished.

In the present embodiment, since the resin film 13 includes the inorganic filler, the resin film 13 is easily torn. Further, since the tearing string 12 includes the water-absorbent fibers, the waterproof property of the optical fiber unit 10 is improved. In this manner, according to the present embodiment, it is possible to implement the optical fiber unit 10 having advantages in workability and functionality.

In the present embodiment, since the plurality of optical fibers 11 are stranded together, the optical fiber units 10 are less likely to be separated from each other when taken out of the optical fiber cable 1. Accordingly, the workability may be further improved.

In the present embodiment, since the plurality of intermittent-connection-type optical fiber ribbons 17 are stranded together, the intermittent-connection-type optical fiber ribbons are less likely to be separated from each other when the optical fiber unit 10 is taken out of the optical fiber cable 1. Accordingly, the workability may be further improved.

Figure 6:
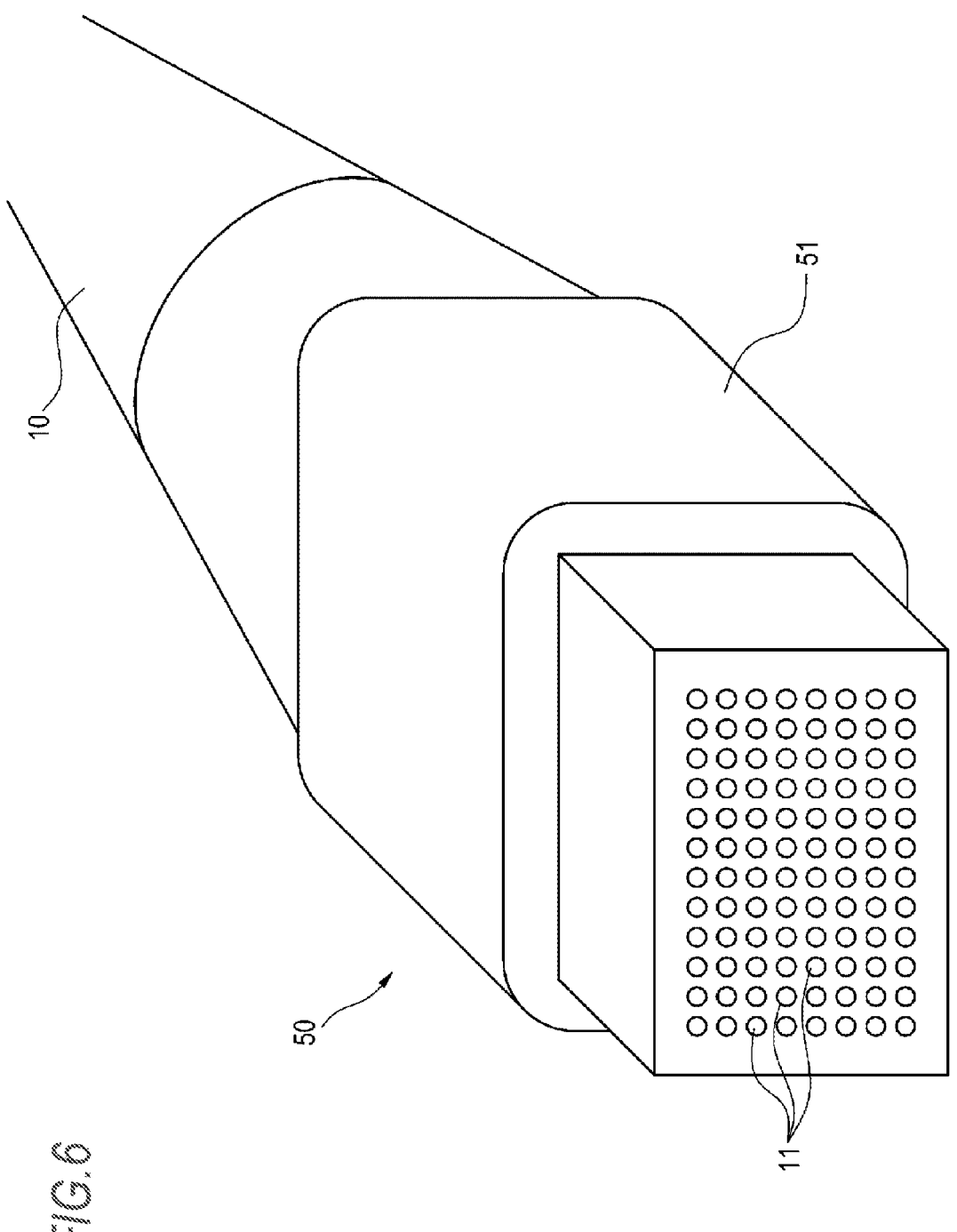
FIG. 6 is a perspective view schematically illustrating a state when the optical fiber unit in FIG. 2 is terminated.

Although an embodiment of the present disclosure is described above, the present disclosure is not limited to the above-described embodiment, and other modifications can be adopted for a part of the configuration as necessary. For example, as illustrated in FIG. 6, the optical fiber unit 10 may be terminated. A connector-equipped optical fiber unit 50 illustrated in FIG. 6 includes a multi-core connector 51 at one end of the optical fiber unit 10. By providing the optical fiber unit 10 with such a configuration in advance, the optical fiber cable 1 may be optically connected easily.

FIG. 4 illustrates a 12-core intermittent-connection-type optical fiber ribbon, and the number of optical fibers is not limited to 12. Further, the plurality of optical fibers 11 may be formed by stranding a plurality of single-core optical fibers instead of an optical fiber ribbon.

DETAILS OF OTHER EMBODIMENTS OF PRESENT DISCLOSURE

Figure 7:
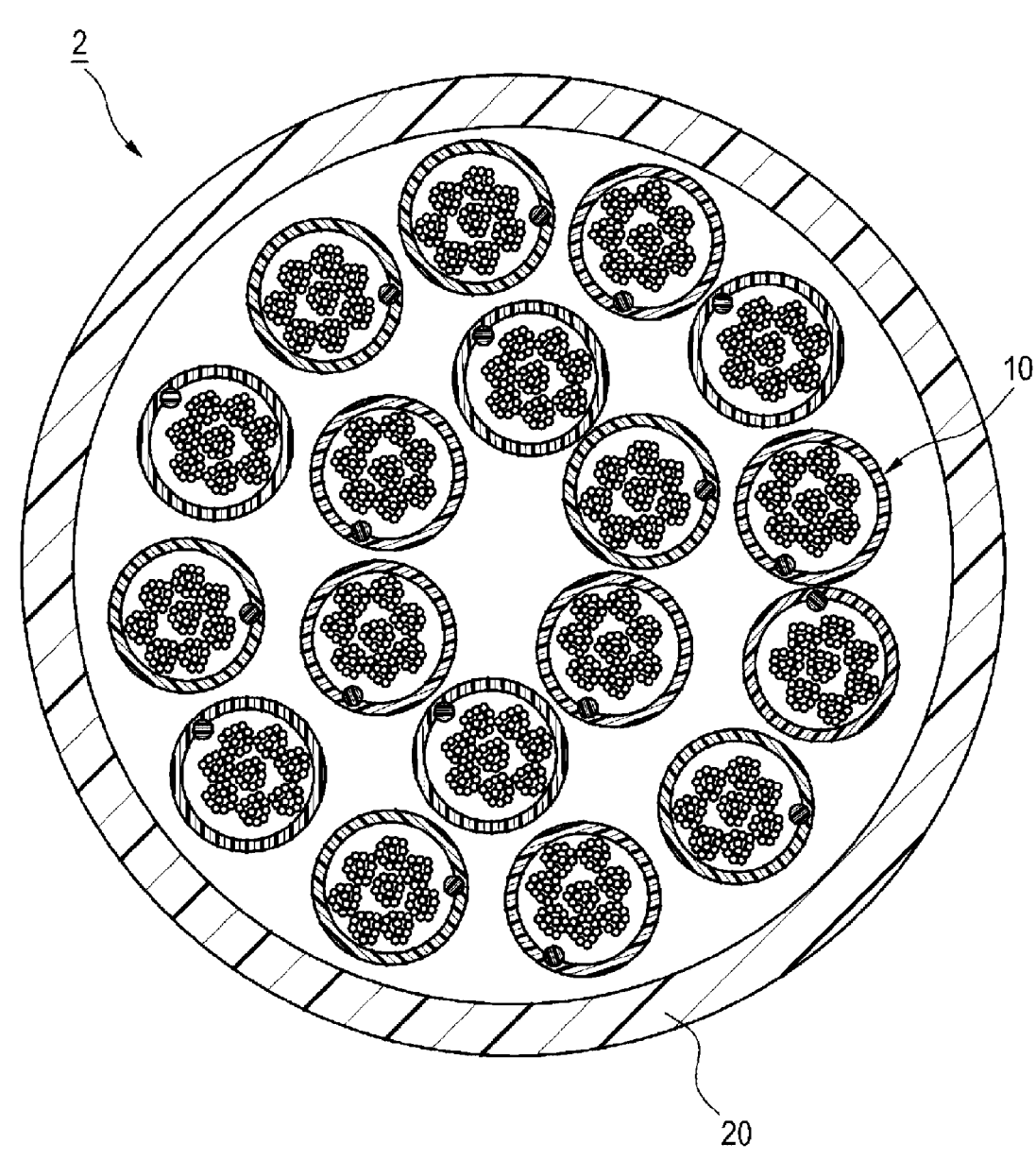
FIG. 7 is a cross-sectional view of an optical fiber cable according to another embodiment of the present disclosure.

FIG. 7 is a cross-sectional view of a slotless optical fiber cable 2 according to another embodiment of the present disclosure. In the configuration illustrated in FIG. 7, the same components as those illustrated in FIGS. 1 to 6 are denoted by the same reference numerals, and the description thereof will be omitted.

In a slotless optical fiber cable 2 as illustrated in FIG. 7, a plurality of optical fiber units 10 are covered with the sheath 20. Unlike the slot-type optical fiber cable 1 illustrated in FIG. 1, the slotless optical fiber cable 2 is not provided with a slot rod. Therefore, the optical fibers 11 may be installed at a larger density.

In this manner, in the slotless optical fiber cable 2 according to the present embodiment, since there is no slot rod and the resin film 13 has a thin film shape in which the film thickness is smaller than the diameter of the tearing string 12, the optical fibers 11 may be installed in the slotless optical fiber cable 2 at a larger density.

Although the present disclosure is described in detail with reference to a specific embodiment, it will be apparent to those skilled in the art that various changes and modifications can be made without departing from the spirit and scope of the present disclosure. The numbers, positions, shapes and the like of components described above are not limited to the above embodiment and can be changed to suitable numbers, positions, shapes and the like on a premise that the present disclosure is carried out.

REFERENCE SIGNS LIST

1: slot-type optical fiber cable
2: slotless optical fiber cable
10: optical fiber unit
11: optical fiber
12: tearing string (fibrous filler)
13: resin film
14: connection portion
15: non-connection portion
17: intermittent-connection-type optical fiber ribbon
20: sheath
30: groove
40: slot rod
50: connector-equipped optical fiber unit
51: multi-core connector
60: strength member
70: another optical fiber cable
75: optical connection box
80: splice tray
85: another optical fiber unit

What is claimed is:
1. An optical fiber unit comprising:
a plurality of optical fibers;
a fibrous filler disposed along the plurality of optical fibers; and
a resin film covering the plurality of optical fibers and the fibrous filler, wherein the resin film has a film thickness smaller than a diameter of the fibrous filler,
only a part of the fibrous filler is embedded in the resin film,
a remaining part of the fibrous filler is exposed inside from an inner periphery of the resin film,
more than 50 percent of the fibrous filler is exposed inside from the inner periphery of the resin film in a cross-sectional view of the optical fiber unit, and
an exposed surface of the fibrous filler directly faces the plurality of optical fibers.
2. The optical fiber unit according to claim 1,
wherein the fibrous filler is provided on an inner surface of the resin film along a longitudinal direction of the optical fibers.
3. The optical fiber unit according to claim 1,
wherein the plurality of optical fibers is formed by stranding a plurality of single-core optical fibers or a plurality of bundles of a plurality of optical fibers.
4. The optical fiber unit according to claim 1,
wherein the plurality of optical fibers is an intermittent-connection-type optical fiber ribbon, and in the inter-mittent-connection-type optical fiber ribbon, some or all of the plurality of optical fibers each includes, intermittently in the longitudinal direction of the plurality of optical fibers, a connection portion at which adjacent optical fibers are connected and a non-connection portion at which adjacent optical fibers are not connected in a state in which the plurality of optical fibers is arranged in parallel in a direction orthogonal to the longitudinal direction.
5. The optical fiber unit according to claim 4,
wherein the plurality of optical fibers is formed by stranding a plurality of the intermittent-connection-type optical fiber ribbons.
6. The optical fiber unit according to claim 1,
wherein the resin film includes an inorganic filler.
7. The optical fiber unit according to claim 1,
wherein the fibrous filler includes a water-absorbent fiber.
8. The optical fiber unit according to claim 1,
wherein the fibrous filler is a PET monofilament.
9. An optical fiber cable comprising:
a plurality of the optical fiber units according to claim 1; and
a sheath covering the plurality of optical fiber units.
10. The optical fiber cable according to claim 9, further comprising:
a slot rod having a groove that accommodates at least one of the plurality of optical fiber units inside the sheath.
11. A connector-equipped cable comprising:
the optical fiber unit according to claim 1; and
at least one multi-core connector provided at one end of the optical fiber unit.

* * * * *